(12) United States Patent
Numazawa et al.

(10) Patent No.: US 11,610,257 B2
(45) Date of Patent: Mar. 21, 2023

(54) VEHICLE RENTAL SYSTEM

(71) Applicant: Honda Motor Co., Ltd., Tokyo (JP)

(72) Inventors: Mai Numazawa, Wako (JP); Kei Kobayashi, Wako (JP); Kotone Nakao, Tokyo (JP); Tomohiro Ito, Wako (JP); Kazutaka Nakabe, Wako (JP)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 17/467,352

(22) Filed: Sep. 6, 2021

(65) Prior Publication Data

US 2022/0084109 A1    Mar. 17, 2022

(30) Foreign Application Priority Data

Sep. 11, 2020    (JP) .............................. JP2020-152524

(51) Int. Cl.
    *G06Q 30/0645*    (2023.01)
    *G06Q 50/30*    (2012.01)
    (Continued)

(52) U.S. Cl.
    CPC ............ *G06Q 30/0645* (2013.01); *B60P 3/20* (2013.01); *B60R 25/24* (2013.01);
    (Continued)

(58) Field of Classification Search
    CPC ......... G06Q 30/0645; G06Q 10/06313; G06Q 30/0284; G06Q 50/30; G06Q 2240/00;
    (Continued)

(56) References Cited

U.S. PATENT DOCUMENTS 10,152,053 B1 * 12/2018 Smith .................... G06Q 10/08
2020/0050198 A1 * 2/2020 Donnelly ............. G01C 21/343
(Continued)

FOREIGN PATENT DOCUMENTS

JP    2004227427 A    8/2004

OTHER PUBLICATIONS

"Car sharing system: what transaction datasets reveal on users' behaviors" Published by IEEE (Year: 2007).*

*Primary Examiner* — Zeina Elchanti
(74) *Attorney, Agent, or Firm* — Duft & Bornsen, PC (57) ABSTRACT

Vehicle-rental-system includes: rental-vehicle for rent to user; user-terminal carried by user; and management-server configured to manage operation, locking, and unlocking of rental-vehicle. Rental-vehicle is automatic-drive-vehicle having first-space available for user, and second-space available for luggage. Management-server includes processor and memory. Processor is configured to perform: receiving reservation-information of rental-vehicle transmitted from user-terminal; calculating usage-fee of rental-vehicle based on reservation-information; acquiring payment-information of usage-fee; setting operation-schedule of rental-vehicle based on reservation-information when payment-information is acquired; outputting travel-command to rental-vehicle in accordance with operation-schedule; and outputting unlocking-command of rental-vehicle when rental-vehicle and user-terminal are mutually authenticated. Reservation-information includes usage-information of at least one of first-space and second-space. Processor is configured to perform: outputting unlocking-command includes outputting unlocking-command of at least one of first-space and second-space based on reservation-information when outputting unlocking-command of rental-vehicle.

5 Claims, 7 Drawing Sheets

(51) Int. Cl.
  *G06Q 30/0283* (2023.01)
  *G06Q 10/0631* (2023.01)
  *B60P 3/20* (2006.01)
  *B60R 25/24* (2013.01)
  *F25D 29/00* (2006.01)
  *B60W 60/00* (2020.01)

(52) U.S. Cl.
  CPC ... *G06Q 10/06313* (2013.01); *G06Q 30/0284* (2013.01); *G06Q 50/30* (2013.01); *B60R 2325/205* (2013.01); *B60W 60/0025* (2020.02); *F25D 29/003* (2013.01); *G06Q 2240/00* (2013.01)

(58) Field of Classification Search
  CPC ..... B60P 3/20; B60R 25/24; B60R 2325/205; B60W 60/0025; F25D 29/003
  USPC ............................................................ 705/5
  See application file for complete search history.

(56) References Cited

U.S. PATENT DOCUMENTS

| | | | |
|---|---|---|---|
| 2020/0108763 A1* | 4/2020 | Subramanian | B60R 22/48 |
| 2020/0193368 A1* | 6/2020 | Bhatia | B60R 25/25 |
| 2020/0241529 A1* | 7/2020 | Salter | G05D 1/0088 |
| 2020/0294173 A1* | 9/2020 | Shah | G06Q 50/30 |

* cited by examiner

VEHICLE RENTAL SYSTEM

CROSS-REFERENCE TO RELATED APPLICATION

This application is based upon and claims the benefit of priority from Japanese Patent Application No. 2020-152524 filed on Sep. 11, 2020, the content of which is incorporated herein by reference.

BACKGROUND OF THE INVENTION

Field of the Invention

This invention relates to a vehicle rental system for renting vehicles to users.

Description of the Related Art

As this type of system, a system has been known that rents a vehicle to a user of a mobile phone who desires to use the vehicle (for example, see Japanese unexamined patent application No. 2004-227427 (JP2004-227427A)). In the system described in JP2004-227427A, when a server device receives usage request of the vehicle, data for unlocking doors of the vehicle is transmitted to the mobile phone based on data from the mobile phone, and usage fee of the vehicle from delivery to return is calculated and notified to the user of the mobile phone.

Recently, automatic drive vehicles that travel automatically without driver's operation have been proposed. By using such automatic drive vehicles as rental vehicles, it becomes possible to enhance the traffic safety and convenience of the public transportation, and to reduce $CO_2$ emissions and the environmental burden by shifting users who used to travel on private vehicles to the public transportation. Therefore, it is desired to provide a vehicle rental service suitable for such automatic drive vehicles.

SUMMARY OF THE INVENTION

An aspect of the present invention is a vehicle rental system, including: a rental vehicle for rent to a user; a user terminal carried by the user; and a management server configured to manage operation, locking, and unlocking of the rental vehicle. The rental vehicle is an automatic drive vehicle having a first space available for the user, and a second space available for luggage. The management server includes a processor and a memory coupled to the processor. The processor is configured to perform: receiving reservation information of the rental vehicle transmitted from the user terminal; calculating a usage fee of the rental vehicle based on the reservation information received in the receiving; acquiring payment information of the usage fee calculated in the calculating; setting an operation schedule of the rental vehicle based on the reservation information received in the receiving when the payment information is acquired in the acquiring; outputting a travel command to the rental vehicle in accordance with the operation schedule set in the setting; and outputting an unlocking command of the rental vehicle when the rental vehicle and the user terminal are mutually authenticated. The reservation information includes usage information of at least one of the first space and the second space. The processor is configured to perform: the outputting unlocking command including outputting the unlocking command of at least one of the first space and the second space based on the reservation information received in the receiving when outputting the unlocking command of the rental vehicle.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention is explained with reference to FIG. 1 to FIG. 10 in the following. A vehicle rental system according to the embodiment of the present invention is applied to rental service of an automatic drive vehicle travelling automatically without operation by a driver.

Figure 1:
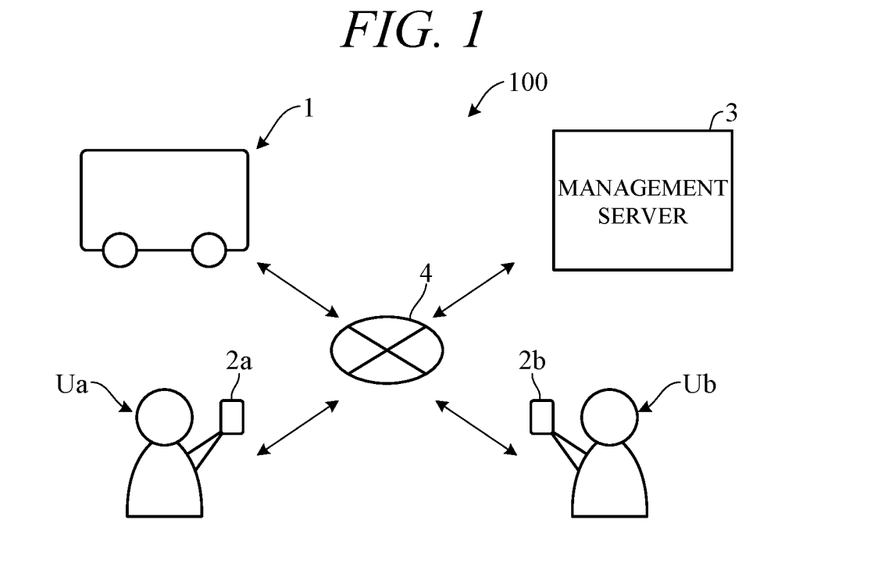
FIG. 1 is a block diagram schematically showing overall configuration of a vehicle rental system according to an embodiment of the present invention.

FIG. 1 is a block diagram schematically showing overall configuration of a vehicle rental system 100 according to the embodiment of the present invention. As shown in FIG. 1, the vehicle rental system 100 includes: a rental vehicle 1 owned by the provider of the vehicle rental service; user terminals 2 (2a, 2b) carried by users U (Ua, Ub) who use the rental vehicle 1; and a management server 3 configured to manage operation, locking, and unlocking of the rental vehicle 1. The user terminal 2 is a smart phone of the user U, for example.

The rental vehicle 1, the user terminals 2, and the management server 3 are connected to a network 4 including the Internet or other public wireless telecommunication network such as mobile phone network, and configured to be communicable with each other through the network 4. The network 4 includes not only public wireless telecommunication network but also closed communication network provided in respective management areas such as wireless LAN, Wi-Fi®, and Bluetooth®.

Although only one rental vehicle 1 is shown in FIG. 1, the vehicle rental system 100 may include plural rental vehicles 1 for rent to the users U. Although two users U are shown in FIG. 1, only one user U or three or more users U may use the rental vehicle 1 in the vehicle rental system 100. Each user U may use the rental vehicle 1 alone or in a group. Although only one single management server 3 is shown in FIG. 1, the management server 3 may be configured as plural servers with distributed functions.

Figure 2:
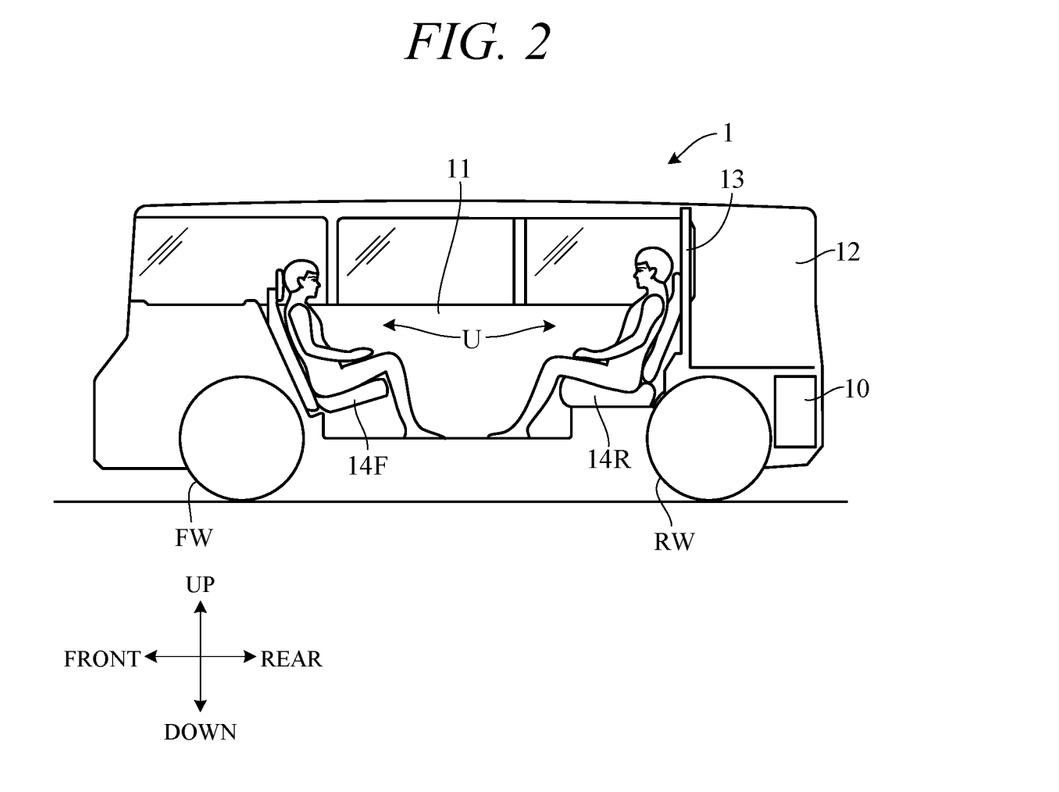
FIG. 2 is a side view schematically showing in-vehicle configuration of a rental vehicle according to the embodiment of the present invention.

FIG. 2 is a side view schematically showing in-vehicle configuration of the rental vehicle 1, showing in-vehicle situation in the rental vehicle 1 used by a group user U of two members, as an example. As shown in FIG. 2, the rental vehicle 1 is a four-wheel vehicle having a lateral pair of front wheels FW and a lateral pair of rear wheels RW, and having: a traveling driving source 10 configured to generate traveling driving force; a braking device (not shown) configured to brake the rental vehicle 1; and a turning device (not shown) configured to turn the rental vehicle 1. The traveling driving source 10 is an internal combustion engine, a travel motor, or both of the internal combustion engine and the travel motor. In other words, the rental vehicle 1 is an engine vehicle, an electric vehicle, or a hybrid vehicle.

The rental vehicle 1 has: a passenger room 11 for the user U at an in-vehicle space between the front wheels FW and the rear wheels RW; and a luggage room 12 for large luggage such as suitcases on the rear of the passenger room 11. The rental vehicle 1 is provided with a partition 13 between the passenger room 11 and the luggage room 12. The luggage in the luggage room 12 cannot be taken out from the passenger room 11 side; the luggage in the passenger room 11 cannot be taken out from the luggage room 12 side. The passenger room 11 and the luggage room 12 have doors including locking mechanism (actuators) (not shown) respectively, and are configured to be independently lockable and unlockable in response to locking command and unlocking command. The in-vehicle space below the luggage room 12 accommodates the traveling driving source 10.

Figure 3:
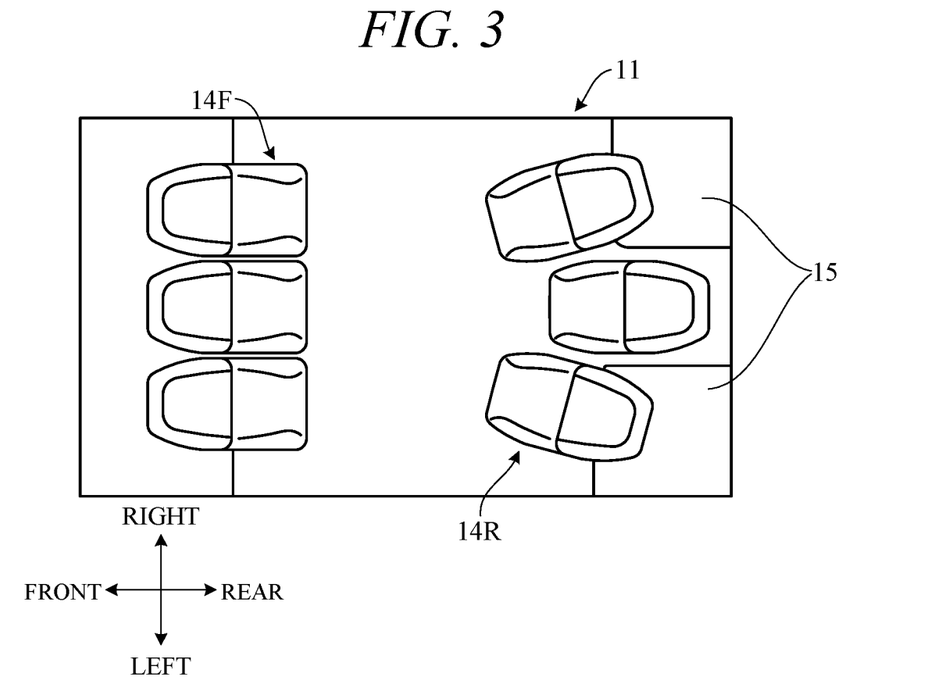
FIG. 3 is a top view schematically showing configuration of a passenger room in FIG. 2.

FIG. 3 is a top view schematically showing configuration of the passenger room 11. As shown in FIG. 2 and FIG. 3, multiple (three in FIG. 3) front seats 14F and multiple (three in FIG. 3) rear seats 14R are provided facing each other at the front and rear of the passenger room 11 so that multiple (three in FIG. 3) persons can be seated side by side. With such a seat arrangement, it becomes possible to provide a comfortable cabin space for the user U who uses the rental vehicle 1 in group, where the user U can communicate with easily.

As shown in FIG. 3, the passenger room 11 of the rental vehicle 1 is provided with refrigerators 15 that is able to accommodate small luggage such as foods, beverages or souvenirs at the rear of the left and right rear seats 14R. Each of the refrigerator 15 has a door including locking mechanism (actuators), and is configured to be lockable and unlockable in response to locking command and unlocking command. The refrigerator 15 can be used by opening and closing from the passenger compartment 11 side when unlocked. By providing the refrigerator 15 in the passenger room 11, the user U can drink cold drinks while using the rental vehicle 1, or can store souvenirs requiring refrigeration.

Figure 4:
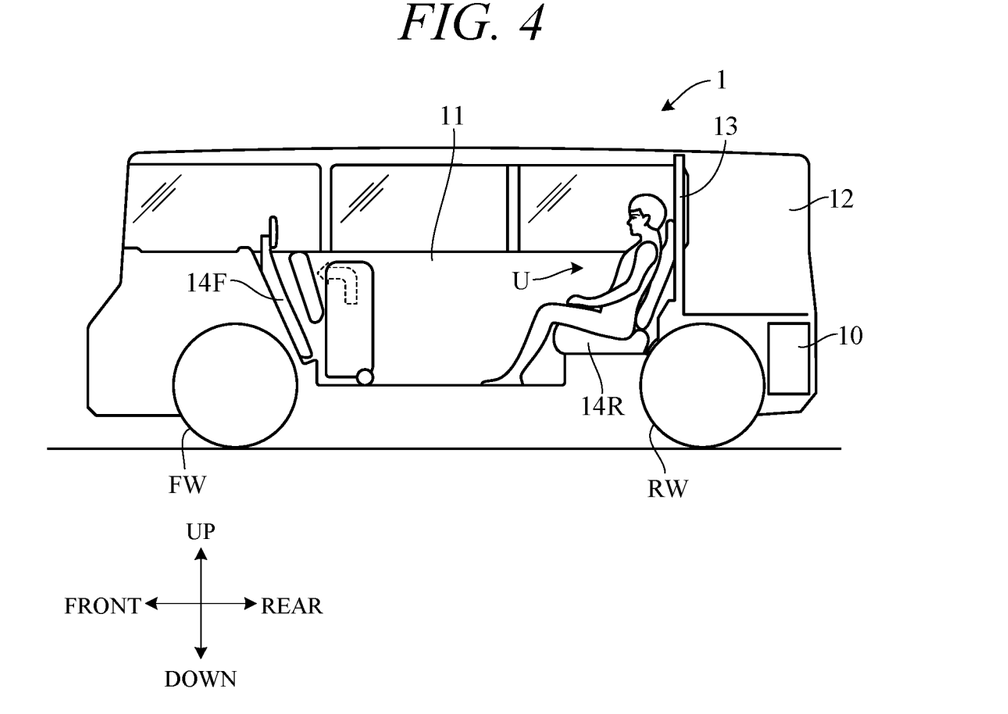
FIG. 4 is a side view showing a situation in the rental vehicle, when loading large luggage in the passenger room in FIG. 2.

FIG. 4 is a side view showing a situation in the rental vehicle 1, when loading large luggage in the passenger room 11. As shown in FIG. 4, the front seats 14F can be used with the seating surface sprung up forward. With such a seat arrangement, it becomes possible to provide a cabin space high convenience for the user U who uses the rental vehicle 1 carrying large luggage such as a suitcase.

Figure 5:
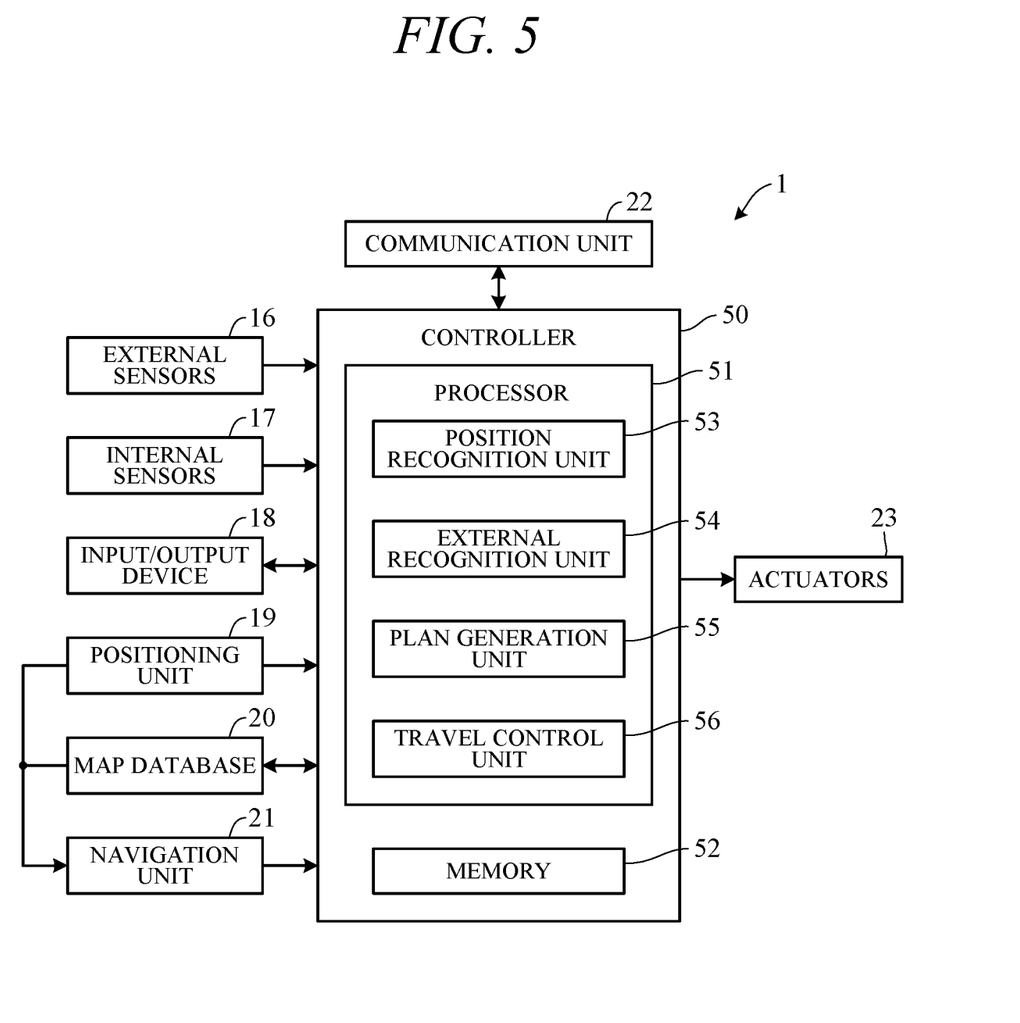
FIG. 5 is a block diagram schematically showing overall configuration of the rental vehicle according to the embodiment of the present invention.

FIG. 5 is a block diagram schematically showing overall configuration of the rental vehicle 1. As shown in FIG. 5, the rental vehicle 1 mainly includes: a controller 50; external sensors 16 electrically connected to the controller 50 respectively; internal sensors 17; an input/output device 18; a positioning unit 19; a map database 20; a navigation unit 21; a communication unit 22; and actuators 23.

The external sensors 16 are multiple sensors that detect the external circumstances, which are information on the surroundings of the rental vehicle 1. For example, the external sensors 16 include a LIDAR that measures the distance from the rental vehicle 1 to an obstacle around the rental vehicle 1 by measuring scattered light corresponding to light radiated in all directions of the rental vehicle 1, a radar that detects other vehicles, obstacles, or the like around the rental vehicle 1 by emitting electro-magnetic waves and detecting the reflected waves, a camera that is mounted on the rental vehicle 1, includes an image sensor, such as CCD or CMOS, and images the periphery (front side, rear side, and lateral sides) of the rental vehicle 1, and the like.

The internal sensors 17 are multiple sensors that detect the travel state of the rental vehicle 1. For example, the internal sensors 17 include a vehicle speed sensor that detects speed of the rental vehicle 1, an acceleration sensor that detects forward, rearward acceleration, and lateral acceleration of the rental vehicle 1 respectively, a rotation speed sensor that detects rotation speed of the traveling driving source 10, a yaw rate sensor that detects rotation angular velocity around the vertical axis of the center of gravity of the rental vehicle 1, and the like.

The input/output device 18 is the generic name of devices for inputting instructions from the user U riding the rental vehicle 1 and outputting information to the user U. For example, the input/output device 18 includes various switches for inputting various instructions from the user U by manipulating manipulation members, a microphone for inputting voice instructions from the user U, a display for providing information to the user U through a display screen, a speaker for providing sound information to the user U, and the like.

The input/output device 18 is configured, for example, as a tablet terminal provided in the rental vehicle 1 and connected to the controller 50 through wireless LAN, Wi-Fi®, Bluetooth®, or the like. The input/output device 18 also functions as the user terminal 2 of the user U riding on the rental vehicle 1.

The positioning unit (GNSS unit) 19 includes a positioning sensor that receives positioning signals transmitted from the positioning satellites. The positioning satellites are artificial satellites such as GPS satellites or quasi-zenith satellites. The positioning unit 19 measures the current position (latitude, longitude, and altitude) of the rental vehicle 1 by using positioning information received by the positioning sensor.

The map database 20 is a device for storing general map information used by the navigation unit 21, and is configured as a hard disk or a semiconductor device, for example. The map information includes position information of roads, information of road shapes such as curvatures, and position information of intersections and branch points. The map information stored in the map database 20 is different from the high-precision map information stored in the memory 52 of the controller 50.

The navigation unit 21 is a device for searching a target route on a road to a destination point. The destination point is input through the input/output device 18 or the communication unit 22. The target route is calculated based on the current position of the rental vehicle 1 measured by the positioning unit 19 and the map information stored in the map database 20.

The communication unit 22 communicates with various servers including the management server 3 through the network 4 shown in FIG. 1, and acquires map information, traffic information, and the like periodically or at an arbitrary timing. The acquired map information is transmitted to the map database 20 or the memory 52, thereby updating the map information stored therein. The communication unit 22 transmits information of the current position of the rental vehicle 1 and the like to the management server 3 through the network 4, and acquires travel commands including information of the destination point and the arrival time, locking commands and unlocking commands of the passenger room 11, the luggage room 12, and the refrigerator 15, and the like from the management server 3.

The actuators 23 are travel actuators for controlling travel of the rental vehicle 1, and actuators for locking and unlocking the passenger room 11, luggage room 12, and refrigerator 15. The actuators 23 operate in response to various commands such as travel commands, locking commands, and unlocking commands input through the input/output device 18 or the communication unit 22.

In the case where the traveling driving source 10 is an internal combustion engine, the travel actuators include a throttle actuator for regulating opening of a throttle valve of the engine. In the case where traveling driving source 10 is a travel motor, the travel actuators include the travel motor. The travel actuators also include brake actuators for operating the braking device and turning actuators for driving the turning device of the rental vehicle 1.

The controller 50 is configured as an electronic control unit (ECU). Specifically, the controller 50 is configured by including a computer having a processor 51 such as CPU (microprocessor), a memory 52 such as ROM, RAM, and other peripheral circuit such as I/O interfaces (not shown). Although multiple ECUs having different functions, such as an engine control ECU, a travel motor control ECU, and a braking device control ECU, may be provided separately, in FIG. 5, one single controller 50 is shown as a set of these ECUs for convenience.

The memory 52 stores the high-precision detailed road map information. The road map information includes information of the road positions, information of the road shapes (such as curvatures), information of the road gradients, position information of the intersections and branch points, information of the number of lanes, information of the lane width, and position information of each lane. The position information of each lane is information of the center position of the lane or the boundary line of the lane position, that is, position information of the lane line or the like. The memory 52 also stores information of various control programs, threshold values used in the programs, and the like.

The processor 51 includes: a position recognition unit 53; an external recognition unit 54; a plan generation unit 55; and a travel control unit 56, as functional constituents.

The position recognition unit 53 recognizes the position (self-position) of the rental vehicle 1 on the map based on the position information of the rental vehicle 1 acquired by the positioning unit 19 and the map information stored in the map database 20. The self-position can be recognized by using the map information (information of building shapes, road surface profiles, or the like) stored in the memory 52 and the surrounding information of the rental vehicle 1 detected by the external sensors 16, in this case, it becomes possible to recognize the self-position with high accuracy. If the self-position can be measured by sensors installed outside, e.g., on the road or on the road side, it is also possible to recognize the self-position by communicating with the sensors through the communication unit 22.

The external recognition unit 54 recognizes the external circumstances around the rental vehicle 1 based on signals from the external sensors 16 such as LIDAR, radar, and camera. The external recognition unit 54 recognizes the positions, speeds, or accelerations of the surrounding vehicles (preceding vehicles or following vehicles) traveling around the rental vehicle 1, the positions of the surrounding vehicles stopping or parking around the rental vehicle 1, and the positions or states of other objects, for example. Other objects include traffic signs, traffic signals, lane lines or stop lines of the roads, buildings, guardrails, utility poles, signboards, pedestrians, bicycles, and the like. The states of other objects include colors of the traffic signals (red, green, and yellow), moving speeds or moving directions of the pedestrians or bicycles, and the like.

The plan generation unit 55 generates a travel trajectory (target trajectory) of the rental vehicle 1 for a predetermined time period from the current point of time based on the target route calculated by the navigation unit 21, the self-position recognized by the position recognition unit 53, and the external circumstances recognized by the external recognition unit 54, for example. When there are multiple trajectories on the target route as candidates for the target trajectory, the plan generation unit 55 selects the most suitable trajectory complying with regulations and satisfying criteria such as efficient and safe travel from among the candidates, and decides the selected trajectory as the target trajectory.

Then, the plan generation unit 55 generates a behavior plan corresponding to the generated target trajectory. The plan generation unit 55 generates various behavior plans corresponding to passing mode for passing the preceding vehicle, lane-changing mode for changing drive lanes, lane-keeping mode for maintaining the current drive lane so as not to mitigate therefrom, deceleration mode, acceleration mode, or the like. When generating the target trajectory, the plan generation unit 55 first determines a drive mode, then generates the target trajectory based on the drive mode.

The travel control unit 56 controls each actuators 23 so that the rental vehicle 1 travels along the target trajectory generated by the plan generation unit 55. More specifically, the travel control unit 56 calculates the driving force required to obtain the target acceleration for each unit time calculated by the plan generation unit 55, considering the travel resistance determined on the basis of the road gradients or the like. Then, the travel control unit 56 performs feedback control of the actuators 23 so that the actual acceleration detected by the internal sensors 17 becomes the target acceleration, for example. In other words, the travel control unit 56 controls the actuators 23 so that the rental vehicle 1 travels at the target travel speed and the target acceleration.

Figure 6:
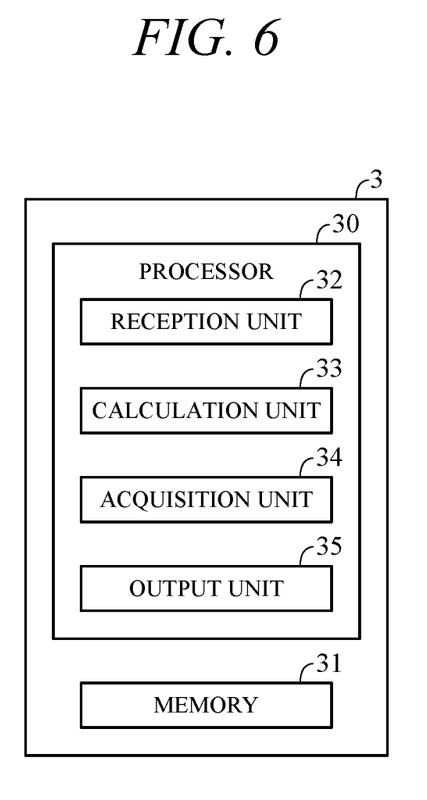
FIG. 6 is a block diagram schematically showing main configuration of a management server according to the embodiment of the present invention.

FIG. 6 is a block diagram schematically showing main configuration of the management server 3 in FIG. 1. As shown in FIG. 6, management server 3 is configured by including a computer having a processor 30 such as CPU (microprocessor), a memory 31 such as ROM, RAM, and other peripheral circuit such as I/O interfaces (not shown).

The memory 31 stores user information of the user U previously registered to the vehicle rental service, and vehicle information of the rental vehicle 1. The user information includes the personal information such as name, contact address, or credit card number of the user U input through the user terminal 2. The vehicle information includes various information of the rental vehicle 1 such as the license plate number, the operation area, base station to which the rental vehicle 1 returns when not operating, the current position, the operation schedule including the rental schedule, and the like. The memory 31 also stores information on various control programs, threshold values used in the programs, and the like.

The processor 30 includes: a reception unit 32; a calculation unit 33; an acquisition unit 34; and an output unit 35, as functional constituents.

The reception unit 32 acquires the reservation information of the rental vehicle 1 transmitted from the user terminal 2 to the management server 3, and accepts usage reservation from the user U. The reservation information includes information of the delivery time (date and time), the boarding point at the delivery time, return time, and the getting-off point at the return time of the rental vehicle 1 desired by the user U. The reception unit 32 determines whether it is possible to deliver the rental vehicle 1 as desired by the user U based on the acquired reservation information and the vehicle information stored in the memory 31.

The reservation information may include usage information of the passenger room 11, the luggage room 12, or the refrigerator 15 of the rental vehicle 1 as required by the user U. The user U can make an additional usage reservation of the refrigerator 15 during when he or she uses the passenger room 11 of the rental vehicle 1. When acquiring the additional usage information of the refrigerator 15, the reception unit 32 determines whether the refrigerator 15 is unoccupied based on the vehicle information stored in the memory 31.

The calculation unit 33 calculates a usage fee of the rental vehicle 1 from the delivery time to the return time based on the reservation information, when it is determined by the reception unit 32 that the rental vehicle 1 can be delivered. The calculation unit 33 also calculates a usage fee of refrigerator 15, when it is determined by the reception unit 32 that the refrigerator 15 is unoccupied.

The vehicle information of the rental vehicle 1 determined to be deliverable by the reception unit 32 such as the appearance picture or the license plate number and the information of the usage fee calculated by the calculation unit 33 are transmitted to the user terminal 2 through the output unit 35, and presented to the user U through the user terminal 2. When the user U agrees with the presented usage fee and completes the payment, for example, in cashless settlement through the user terminal 2, the payment information is transmitted from the credit card company or the like to the management server 3.

The acquisition unit 34 acquires the payment information transmitted from the credit card company or the like to the management server 3. When it is confirmed by the acquisition unit 34 that the payment information has been acquired and the payment of the usage fee calculated by the calculation unit 33 has been completed, the usage reservation of the rental vehicle 1 by the user U becomes completed and the operation schedule of the rental vehicle 1 stored in the memory 31 becomes updated based on the reservation information. Also, a notification for notifying that the usage reservation of the rental vehicle 1 has been completed and authentication information for the security authentication between the user terminal 2 and the rental vehicle 1 are transmitted to the user terminal 2 through the output unit 35.

The authentication information is transmitted in a form such as two-dimensional code or text form, for example. A read sensor, a numeric keypad, or the like for the security authentication is provided outside the rental vehicle 1, for example, in the vicinity of the door of the passenger room 11, and the security authentication is performed by reading the two-dimensional code (authentication information) displayed on the display of the user terminal 2. It is also possible for the user U to perform the security authentication by entering a text string (authentication information) via the numeric keypad.

The output unit 35 transmits the travel command, the locking command, and the unlocking command to the rental vehicle 1 in accordance with the operation schedule stored in the memory 31. For example, in the travel command, the boarding point at the delivery time specified in the reservation information is specified as the destination point, and the delivery time specified in the reservation information is specified as the arrival time. By such travel commands from the management server 3, operation of the rental vehicle 1 is managed, the rental vehicle 1 is delivered to the boarding point specified by the user U, or the rental vehicle 1 returns to the base station.

When the security authentication is performed between the rental vehicle 1 delivered to the boarding point at the delivery time and the user terminal 2 carried by the user U, a notification notifying that the security authentication has been completed is transmitted from the rental vehicle 1 and the user terminal 2 to the management server 3. When acquiring the notification notifying that the security authentication has been completed, the output unit 35 outputs the unlocking command of the rental vehicle 1 (unlocking command of the passenger room 11, the luggage room 12, or the refrigerator 15). It is also possible for the user U to perform the security authentication by entering authentication information such as a text string received through the user terminal 2 through the input/output device 18 of the rental vehicle 1.

Figure 7:
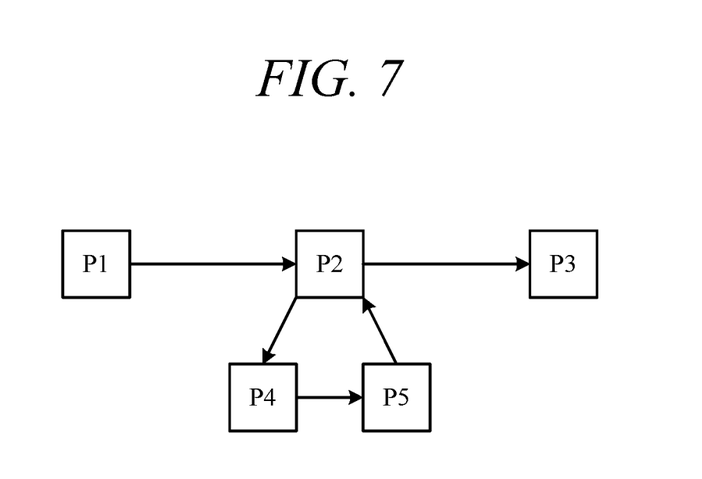
FIG. 7 is a diagram for explaining an operation route of the rental vehicle managed by the management server in FIG. 6.

FIG. 7 is a diagram for explaining an operation route of the rental vehicle 1, showing relatively long-distance operation route of the first user Ua travelling from a departure point P1 such as his or her own home, through a passing point P2 such as a tourist spot, to a destination point P3 such as a hotel. FIG. 7 also shows relatively short-distance operation route of the second user Ub travelling from a departure point P4 to a destination point P5 around the tourist spot.

In the case as shown in FIG. 7, when the first user Ua reserves the rental vehicle 1 for one single rental time period from the delivery at the departure point P1 to the return at the destination point P3, the usage fee is incurred uniformly throughout the rental time period including an unoccupied time period T1 for sightseeing or the like around the passing point P2. Alternatively, if the first user Ua reserves the rental vehicle 1 for a former half rental time period from the departure point P1 to the passing point P2 and a latter half rental time period from the passing point P2 to the destination point P3, the first user Ua cannot leave his or her luggage in the rental vehicle 1 when getting off at the passing point P2 and charged basic fees for the separate two rental time periods.

Therefore, in the present embodiment, the management server 3 is configured so as to accept not only usage reservation for an all-room usage to use both of the passenger room 11 and the luggage room 12 of the rental vehicle 1, but also usage reservation for a sharing usage where the second user Ub uses the passenger room 11 of the rental vehicle 1 whose luggage room 12 is being used by the first user Ua.

Figure 8:
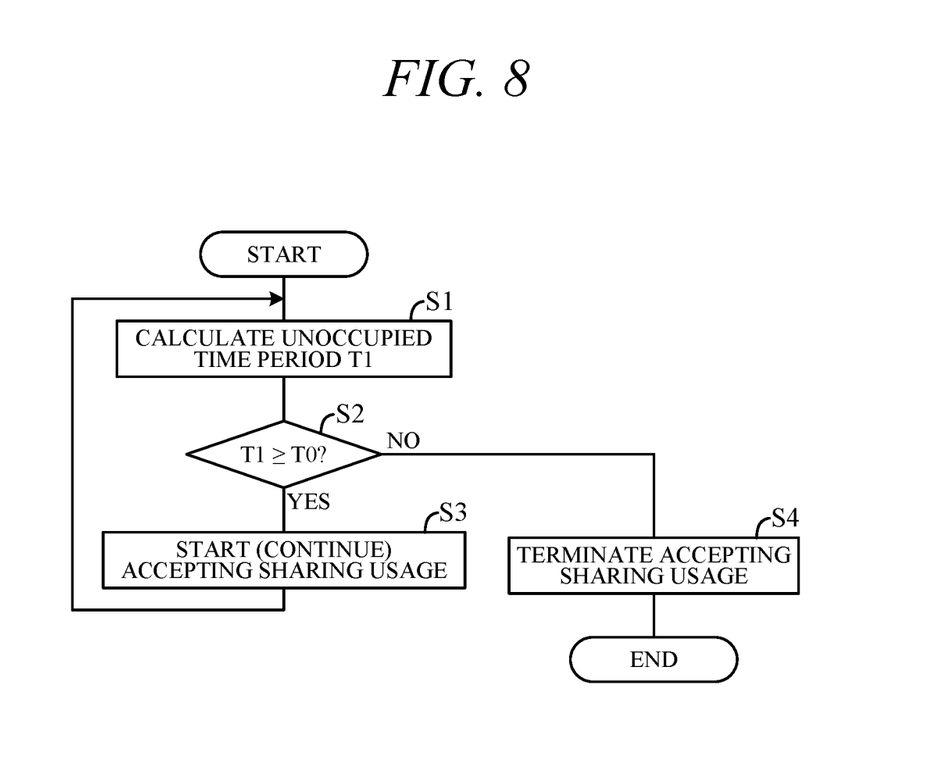
FIG. 8 is a flowchart showing an example of processing performed by the management server according to the embodiment of the present invention, when determining whether to accept usage reservation for sharing usage of the rental vehicle.
Figure 9:
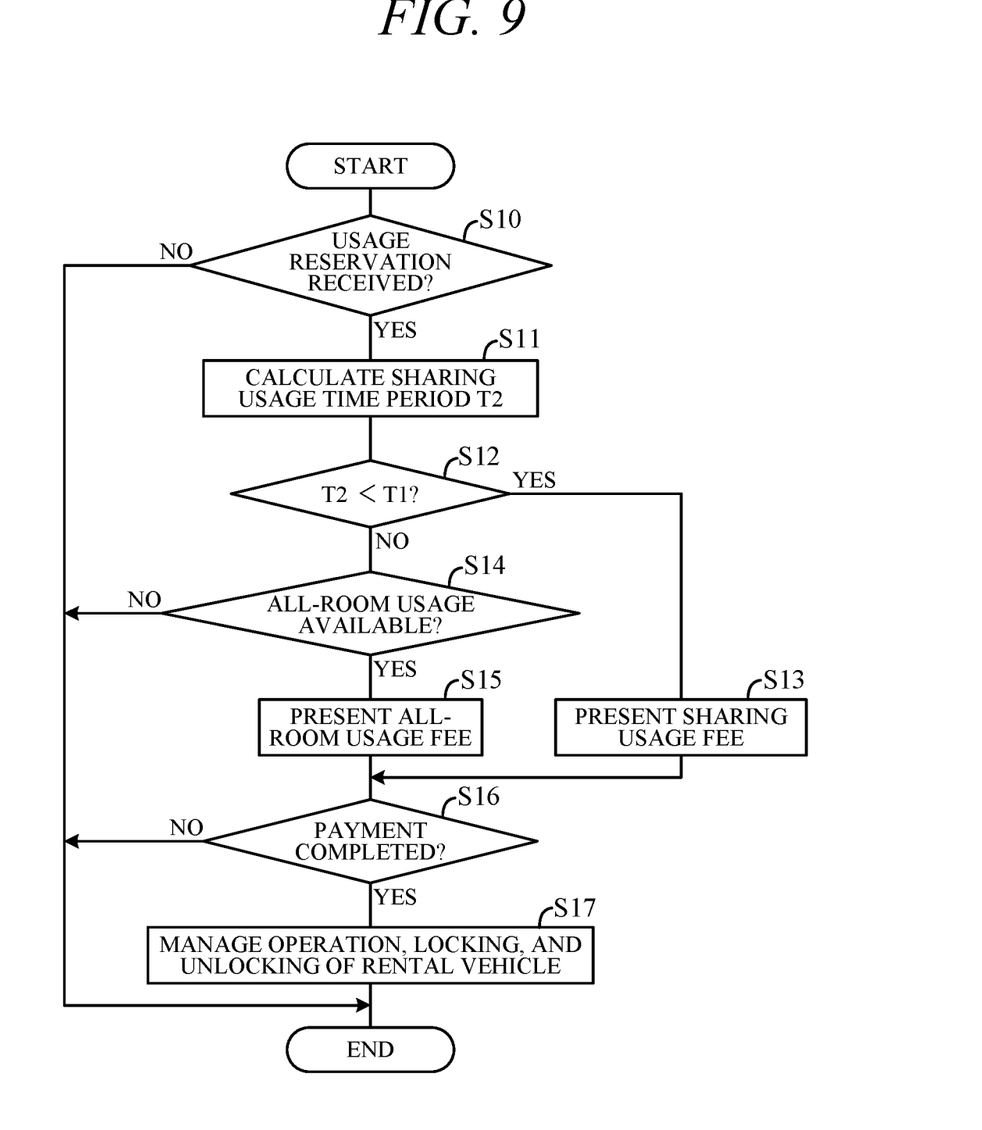
FIG. 9 is a flowchart showing an example of processing performed by the management server according to the embodiment of the present invention, when accepting usage reservation from second user.

FIG. 8 and FIG. 9 are flowcharts respectively showing an example of processing performed by the management server 3, showing processing performed by the processor 30 in FIG. 6. FIG. 8 is a flowchart showing an example of determination processing whether to accept the usage reservation for the sharing usage of the rental vehicle 1. The determination processing in FIG. 8 is started when the first user Ua using the rental vehicle 1 as the all-room usage temporarily gets off the rental vehicle 1 while continuing to use the luggage room 12, and repeated in a predetermined cycle.

The first user Ua, who wants others to use the rental vehicle 1 during he or she does not ride on as a sharing usage, inputs allowance information for the sharing usage specifying the re-boarding time (date and time) when and the re-boarding point where he or she wants to board the rental vehicle 1 again through the first user terminal 2a. The input/output device 18 of the rental vehicle 1 may be used as the first user terminal 2a to input the allowance information for the sharing usage.

In the processing described in FIG. 8, first, in S1 (S: processing step), the reception unit 32 calculates the unoccupied time period T1 from the getting-off time when the first user Ua temporarily gets off the rental vehicle 1 to the re-boarding time based on the allowance information for the sharing usage received from the first user terminal 2a. The operation schedule of the rental vehicle 1 stored in the memory 31 is updated based on the calculated unoccupied time period T1 of the rental vehicle 1. Next, the processing goes to S2 and it is determined whether the unoccupied time period T1 calculated in S1 is equal to or longer than a predetermined time period T0 (for example, thirty minutes).

When S2 is affirmative, the processing goes to S3, reception of the usage reservation for the sharing usage of the rental vehicle 1 by the second user Ub other than the first user Ua using the rental vehicle 1 is started, and the processing returns to S1. On the other hand, when S2 is negative, the processing goes to S4, reception of the usage reservation for the sharing usage of the rental vehicle 1 by the second user Ub is not started or terminated, and the processing ends.

FIG. 9 is a flowchart showing processing when accepting the usage reservation from the second user Ub. The processing described in FIG. 9 is started when the management server 3 is powered on and the vehicle rental service provision is started, for example, and repeated in a predetermined cycle.

In the processing described in FIG. 9, first, in S10, the reception unit 32 determines whether reservation information of the rental vehicle 1 is received from the second user terminal 2b of the second user Ub. When S10 is negative, the processing ends.

On the other hand, when S10 is affirmative, the processing goes to S11 and the sharing usage time period T2 for the sharing usage of the rental vehicle 1 by the second user Ub is calculated based on the operation schedule of the rental vehicle 1 stored in the memory 31 and the reservation information received in S10. For example, the time period for travelling from the passing point P2 (FIG. 7) where the first user Ua temporarily gets off the rental vehicle 1, through the departure point P4 and the destination point P5 of the second user Ub, to the passing point P2 where the first user Ua boards the rental vehicle 1 again is estimated and calculated as the sharing usage time period T2.

Next, in S12, it is determined whether the sharing usage time period T2 calculated in S11 is shorter than the unoccupied time period T1 of the rental vehicle 1 based on the operation schedule of the rental vehicle 1 stored in the memory 31. When S12 is affirmative, it is determined that the rental vehicle 1 is available for the sharing usage and the processing goes to S13.

In S13, the calculation unit 33 calculates the usage fee for the sharing usage of the rental vehicle 1 based on the reservation information received in S10 and the output unit 35 transmits the calculated usage fee to the second user terminal 2b. The usage fee for the sharing usage of the rental vehicle 1 is set lower than the usage fee for the all-room usage of the rental vehicle 1.

On the other hand, when S12 is negative, it is determined that the rental vehicle 1 is not available for the sharing usage and the processing goes to S14. In S14, it is determined whether the rental vehicle 1 is available for the all-room usage based on the operation schedule of the rental vehicle 1 stored in the memory 31 and the reservation information received in S10. In other words, it is determined whether the vehicle rental system 100 has a rental vehicle 1 not used by other user U and available for the all-room usage.

When S14 is affirmative, it is determined that the rental vehicle 1 is available for the all-room usage and the processing goes to S15. On the other hand, when S14 I negative, it is determined that the rental vehicle 1 is not available for the sharing usage nor the all-room usage, the output unit 35 transmits notification for notifying that there is no rental vehicle 1 available for usage reservation to the second user terminal 2b, and the processing ends.

In S15, the calculation unit 33 calculates the usage fee for the all-room usage of the rental vehicle 1 based on the reservation information received in S10 and the output unit 35 transmits the calculated usage fee to the second user terminal 2b.

Next, in S16, the acquisition unit 34 determines whether payment of the usage fee calculated in S13 or S15 is completed and the payment information is acquired in a predetermined time period. When S16 is affirmative, the operation schedule of the rental vehicle 1 stored in the memory 31 is updated based on the reservation information received in S10 and the processing goes to S17. On the other hand, when S16 is negative, the output unit 35 transmits a notification for notifying that the usage reservation of the rental vehicle 1 has not been completed to the second user terminal 2b and the processing ends.

In S17, the output unit 35 outputs the travel command, the locking command, and the unlocking command to the rental vehicle 1 in accordance with the operation schedule of the rental vehicle 1 stored in the memory 31, thereby managing operation, locking, and unlocking of the rental vehicle 1. When the usage reservation for the sharing usage of the rental vehicle 1 by the second user Ub is completed, the usage fee for the all-room usage of the rental vehicle 1 by the first user Ua is reduced in accordance with, for example, the usage time period for the sharing usage (cash back).

In the processing described above, when an unoccupied time period T1 of the predetermined time period T0 or longer is generated during the usage period of the rental vehicle 1 by the first user Ua (S1 to S3 in FIG. 8), sharing usage of the rental vehicle 1 is preferentially offered to the second user Ub (S10 to S13 in FIG. 9). With this, for the first user Ua and the second user Ub, it becomes possible to reduce usage fee of the rental vehicle 1, and for the provider of the vehicle rental service, it becomes possible to utilize the rental vehicle 1 efficiently.

Figure 10:
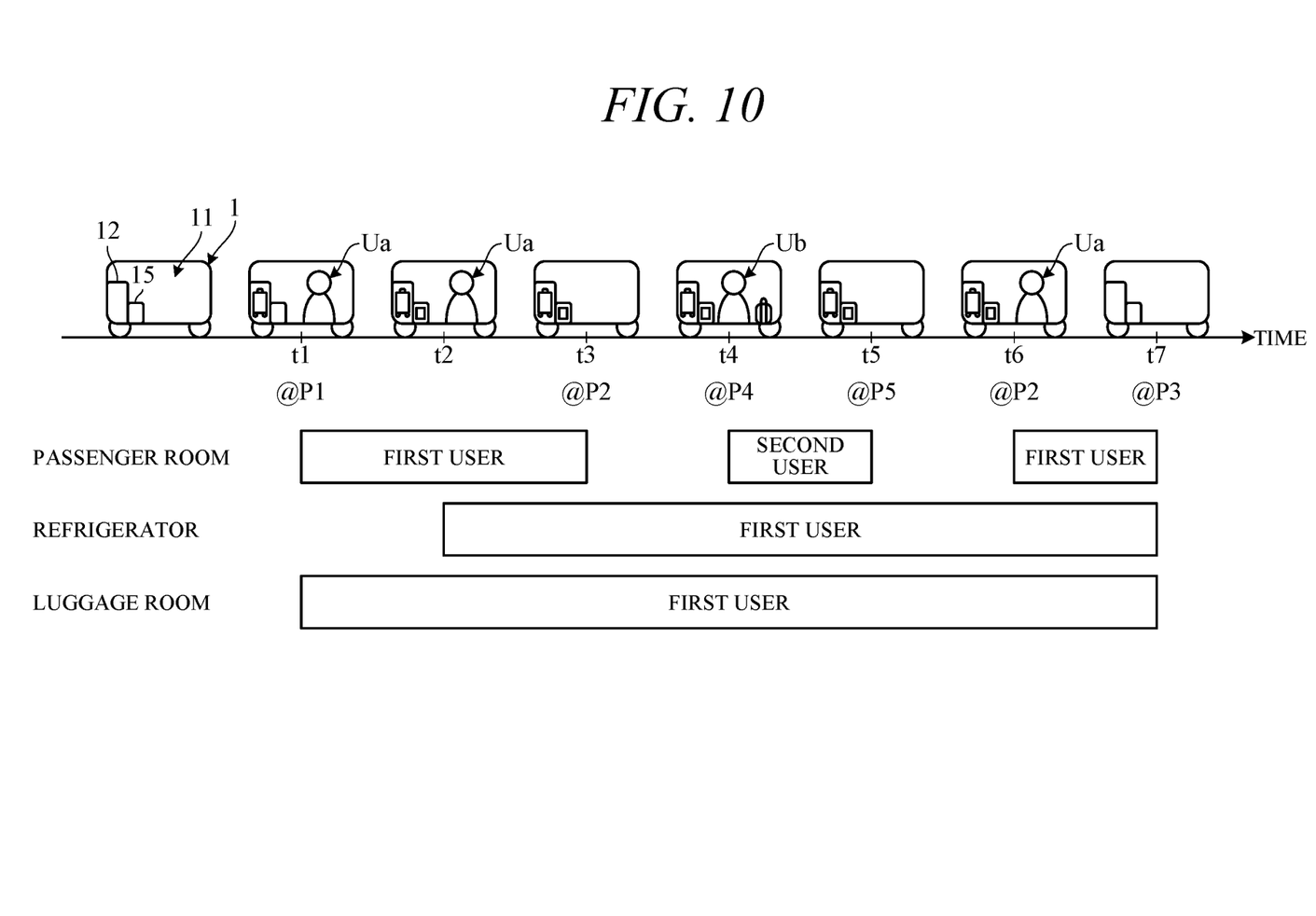
FIG. 10 is a diagram for explaining main operation of the vehicle rental system according to the embodiment of the present invention.

FIG. 10 is a diagram for explaining main operation of the vehicle rental system 100 according to the embodiment of the present invention. As shown in FIG. 10, when the usage reservation of the rental vehicle 1 for the all-room usage from time t1 to time t7 by the first user Ua is completed, the rental vehicle 1 is delivered to the departure point P1 of the first user Ua (FIG. 7) by the time t1 (S10 to S12, and S14 to S17 in FIG. 9).

At the time t1, when the security authentication is performed between the rental vehicle 1 and the first user terminal 2a, the passenger room 11 and the luggage room 12 of the rental vehicle 1 is unlocked and the first user Ua boards in the passenger room 11 with his or her luggage loaded in the luggage room 12 (S17 in FIG. 9). When the first user Ua sets the destination point through the input/output device 18 of the rental vehicle 1, the target route is searched by the navigation unit 21 and the rental vehicle 1 starts traveling.

At time t2, when the first user Ua performs the usage reservation of the refrigerator 15 through the first user terminal 2a and pays the additional usage fee, the refrigerator 15 is unlocked (S10 to S12, and S14 to S17 in FIG. 9). With this, it becomes possible for the first user Ua to freely use the refrigerator 15 in the passenger room 11 and to store souvenirs requiring refrigeration purchased on his or her way or the like.

When the rental vehicle 1 is approaching to the passing point P2 set as the first destination point (FIG. 7), it is notified through the input/output device 18 of the rental vehicle 1 to the first user Ua that the destination point is approaching. The first user Ua prepares for getting off, specifies the re-boarding time t6 at the passing point P2 through the first user terminal 2a, and enters the allowance information for the sharing usage of the passenger room 11 during he or she does not ride on the rental vehicle 1.

In the unoccupied time period T1 from the getting-off time t3 to the re-boarding time t6 of the first user Ua, when the second user Ub who wants to travel in a short distance around the passing point P2 performs the usage reservation of the rental vehicle 1, the sharing usage is offered to the second user Ub (S1 to S3 in FIG. 8, and S10 to S13 in FIG. 9). When the usage reservation for the sharing usage is completed, at time t4, the rental vehicle 1 is delivered to the departure point P4 of the second user Ub (FIG. 7) and the first user Ua receives the cash back of the usage fee (S16 and S17 in FIG. 9).

At the time t4, when the security authentication is performed between the rental vehicle 1 and the second user terminal 2b, only the passenger room 11 of the rental vehicle 1 is unlocked while the luggage room 12 and the refrigerator 15 of the rental vehicle 1 are kept locked, and the second user Ub boards in the passenger room 11 with his or her luggage loaded in the passenger room 11 (FIG. 4, S17 in FIG. 9). The rental vehicle 1 moves to the destination point P5 with the second user Ub on board, and when the second user Ub gets off at time t5, moves to the passing point P2 (re-boarding point) by the re-boarding time t6 of the first user Ua and waits there (S17 in FIG. 9).

At time t6, when the security authentication is performed between the rental vehicle 1 and the first user terminal 2a, all of the passenger room 11, the luggage room 12, and the refrigerator 15 of the rental vehicle 1 are unlocked (S17 in FIG. 9). When the rental vehicle 1 moves to the destination point P3 (FIG. 7) with the first user Ua on board and, at time t7, the first user Ua gets off the rental vehicle 1 with all of his or her luggage in the luggage room 12 and the refrigerator 15 unloaded, usage of the rental vehicle 1 by the first user Ua is completed and the rental vehicle 1 is locked (S17 in FIG. 9).

The present embodiment can achieve advantages and effects such as the following:

(1) The vehicle rental system 100 includes: the rental vehicle 1 for rent to the user U; the user terminal 2 carried by the user U; and the management server 3 configured to manage operation, locking, and unlocking of the rental vehicle 1 (FIG. 1). The rental vehicle 1 is an automatic drive vehicle having the passenger room 11 available for the user U, and the luggage room 12 available for the luggage.

The management server 3 includes: the reception unit 32 configured to receive the reservation information of the rental vehicle 1 transmitted from the user terminal 2; the calculation unit 33 configured to calculate the usage fee of the rental vehicle 1 based on the reservation information received by the reception unit 32; the acquisition unit 34 configured to acquire the payment information of the usage fee calculated by the calculation unit 33; and the output unit 35 configured to set the operation schedule of the rental vehicle 1 based on the reservation information received by the reception unit 32 when the payment information is acquired by the acquisition unit 34, to output the travel command to the rental vehicle 1 in accordance with the operation schedule, and to output the unlocking command of the rental vehicle 1 when the rental vehicle 1 and the user terminal 2 are mutually authenticated (FIG. 6).

The reservation information includes the usage information of at least one of the passenger room 11 and the luggage room 12. The output unit 35 outputs the unlocking command of at least one of the passenger room 11 and the luggage room 12 based on the reservation information when outputting the unlocking command of the rental vehicle 1. With this, it becomes possible to provide vehicle rental service suitable for the automatic drive vehicle and friendly to the users U. In particular, since the passenger room 11 and the luggage room 12 independent from each other can be used as necessary, it becomes possible to use the rental vehicle 1 not only by riding, but also by just loading luggage without riding.

(2) The users U includes the first user Ua using the rental vehicle 1 from the departure point P1 through the passing point P2 to the destination point P3, and the second user Ub other than the first user Ua. The user terminal 2 includes the first user terminal 2a carried by the first user Ua, and the second user terminal 2b carried by the second user Ub. The reception unit 32 receives the reservation information of the rental vehicle 1 transmitted from the second user terminal 2b when the unoccupied time period T1 from the getting-off time when the first user Ua gets off the rental vehicle 1 at the passing point P2 to the re-boarding time when the first user Ua boards the rental vehicle 1 again is equal to or longer than the predetermined time period T0 (for example, thirty minutes). With this, it becomes possible to utilize the rental vehicle 1 efficiently, for example, when the second user Ub uses the passenger room 11 only, as sharing usage, during when the first user Ua temporarily leaves the rental vehicle 1 for sightseeing or the like with his or her luggage left in the luggage room 12 of the rental vehicle 1 under use.

(3) The rental vehicle 1 includes the rental vehicle 1 used by the first user Ua, and the rental vehicle 1 not used by the first user Ua. The calculation unit 33 calculates the usage fee of the rental vehicle 1 used by the first user Ua preferentially than the rental vehicle 1 not used by the first user Ua when the reservation information of the rental vehicle 1 transmitted from the second user terminal 2b is received by the reception unit 32 (S10 to S13 in FIG. 9). With this, it becomes possible to utilize the rental vehicle 1 efficiently.

(4) The passenger room 11 includes the refrigerator 15 (FIG. 3). The reception unit 32 receives the additional usage information of the refrigerator 15 transmitted from the user terminal 2 during when the user U uses the passenger room 11. The calculation unit 33 calculates the additional usage fee based on the additional usage information received by the reception unit 32. The acquisition unit 34 acquires the additional payment information of the additional usage fee calculated by the calculation unit 33. The output unit 35 outputs the unlocking command of the refrigerator 15 when the additional payment information is acquired by the acquisition unit 34. With this, the user U using the rental vehicle 1 can use the refrigerator 15 as necessary, and it becomes possible to improve convenience of using the passenger room 11.

(5) The reception unit 32 receives the additional usage information of the refrigerator 15 transmitted from the user terminal 2 on condition that the refrigerator 15 is unused during when the user U uses the passenger room 11. With this, since the user U can use the refrigerator 15 depending on the usage status even when using only the passenger room 11 of the rental vehicle 1, for example, as the sharing usage, it becomes possible to further improve convenience of using the passenger room 11.

(6) The partition 13 is provided between the passenger room 11 and the luggage room 12 (FIG. 2, FIG. 4). With this, it becomes impossible to take out the luggage in the luggage room 12 from the passenger room 11 side nor to take out the luggage in the passenger room 11 from the luggage room 12 side.

The above embodiment may be modified into various forms. In the following, some modifications will be described. Although in the above embodiment a specific example of the rental vehicle 1 is described (for example, in FIG. 2 to FIG. 4), a rental vehicle may be any automatic drive vehicle having a first space available for users and a second space available for luggage.

Although in the above embodiment the sharing usage of the rental vehicle 1 by the first user Ua moving from his or her own home passing the tourist spot to the hotel and the second user Ub moving around the tourist spot is exemplified, usage modes of the rental vehicle 1 are not limited to such cases. For example, the first user Ua may use the rental vehicle 1 to deliver his or her luggage in the luggage room 12 to the hotel during sightseeing around the passing point. In this case, regarding a porter of the hotel as the second user Ub, authentication information for unlocking the luggage room 12, notification of the arrival schedule of the rental vehicle 1, or the like are transmitted to the second user terminal 2b such as a tablet terminal of the hotel.

Although in the above embodiment the usage reservation of the sharing usage is accepted when the unoccupied time period T1 of the rental vehicle 1 is thirty minutes or longer, as an example, the unoccupied time period may be set shorter. In this case, the passenger room 11 of the rental vehicle 1 may be offered as a rest place with the rental vehicle 1 parked around the re-boarding point of the first user Ua or circulatingly moving around the re-boarding point.

The above embodiment can be combined as desired with one or more of the above modifications. The modifications can also be combined with one another.

According to the present invention, it becomes possible to provide vehicle rental service suitable for the automatic drive vehicle.

Above, while the present invention has been described with reference to the preferred embodiments thereof, it will be understood, by those skilled in the art, that various changes and modifications may be made thereto without departing from the scope of the appended claims.

What is claimed is:

1. A vehicle rental system, comprising: a rental vehicle for rent to a user; a user terminal of the user; and a management server configured to manage operation, locking, and unlocking of the rental vehicle, wherein the rental vehicle is an automatic drive vehicle having a first space available for the user, and a second space available for luggage, wherein the first space includes a refrigerator, wherein the management server includes a processor and a memory coupled to the processor, wherein the memory is configured to store an operation schedule of the rental vehicle, wherein the processor is configured to perform:

receiving reservation information of the rental vehicle including a start time and an end time transmitted from the user terminal; determining whether it is possible to deliver the rental vehicle based on the reservation information and the operation schedule stored in the memory; updating the operation schedule stored in the memory e when it is determined that it is possible to deliver the rental vehicle; outputting a travel command and an unlocking command of the rental vehicle to the rental vehicle in accordance with the operation schedule; receiving additional usage information of the refrigerator transmitted from the user terminal when the user uses the first space in a reservation time period from the start time to the end time; calculating a usage fee of the rental vehicle based on the reservation information, including calculating an additional usage fee based on the additional usage information; acquiring payment information of the usage fee, including acquiring additional payment information of the additional usage fee; and outputting an unlocking command of the refrigerator when the additional payment information is acquired.

2. The vehicle rental system according to claim 1, wherein the user is a first user using the rental vehicle from a first departure point through a passing point to a first destination point, wherein the user terminal is a first user terminal, wherein the reservation information is first reservation information, wherein the processor is further configured to perform: receiving second reservation information of the rental vehicle including a second departure point and a second destination point transmitted from a second user terminal of a second user other than the first user; receiving allowance information for allowing sharing usage of the rental vehicle including a re-boarding time and a re-boarding point transmitted from the first user terminal and position information of the rental vehicle transmitted from the rental vehicle when the first user temporarily gets off the rental vehicle at the passing point during the reservation time period; calculating an unoccupied time period until the re-boarding time based on the allowance information; calculating a travel time period of the rental vehicle traveling from the passing point passing through the second departure point and the second destination point to the re-boarding point based on the second reservation information, the allowance information, and the position information of the rental vehicle;

and determining whether the rental vehicle is available for the sharing usage based on the unoccupied time period and the travel time period.

3. The vehicle rental system according to claim 2, wherein the rental vehicle is a first rental vehicle, wherein the processor is further configured to perform: calculating a usage fee of the first rental vehicle lower than a second rental vehicle not used by the first user when the second reservation information of the rental vehicle transmitted from the second user terminal is received.

4. The vehicle rental system according to claim 1, wherein the processor is configured to perform: the receiving including receiving the additional usage information of the refrigerator transmitted from the user terminal on condition that the refrigerator is unused when the user uses the first space.

5. The vehicle rental system according to claim 1, further comprising: a partition provided between the first space and the second space.

* * * * *